United States Patent
Mushika

(10) Patent No.: US 7,245,363 B2
(45) Date of Patent: Jul. 17, 2007

(54) OPTICAL SENSOR

(75) Inventor: Yoshihiro Mushika, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 329 days.

(21) Appl. No.: 10/512,408

(22) PCT Filed: Feb. 12, 2004

(86) PCT No.: PCT/JP2004/001512

§ 371 (c)(1),
(2), (4) Date: Oct. 21, 2004

(87) PCT Pub. No.: WO2004/077819

PCT Pub. Date: Sep. 10, 2004

(65) Prior Publication Data

US 2005/0224695 A1 Oct. 13, 2005

(30) Foreign Application Priority Data

Feb. 25, 2003 (JP) .............................. 2003-047301

(51) Int. Cl.
*G01B 9/00* (2006.01)
(52) U.S. Cl. ..................................... 356/126
(58) Field of Classification Search ........ 356/511–514, 356/124, 126, 127, 515, 517
See application file for complete search history.

(56) References Cited

U.S. PATENT DOCUMENTS

| 4,725,144 A | * | 2/1988 | Nelson et al. ............... 356/513 |
| 6,535,250 B1 | | 3/2003 | Okisu et al. |
| 2002/0102102 A1 | | 8/2002 | Watanabe et al. |
| 2004/0061917 A1 | | 4/2004 | Mushika |
| 2005/0152019 A1 | | 7/2005 | Mushika |

FOREIGN PATENT DOCUMENTS

| JP | 11-069209 A | 3/1999 |
| JP | 11-231373 A | 8/1999 |
| JP | 2001-257932 A | 9/2001 |
| JP | 2003-008987 A | 1/2003 |

* cited by examiner

*Primary Examiner*—Hwa (Andrew) Lee
(74) *Attorney, Agent, or Firm*—Akin Gump Strauss Hauer & Feld LLP

(57) ABSTRACT

An optical detection system according to the present invention includes: a spatial light modulator for modulating the phase of incoming light; a photodetector having a plurality of photosensitive areas to receive the light of which the phase has been modulated by the spatial light modulator; a photosensor selecting section for selecting at least one of the photosensitive areas and activating the selected photosensitive area effectively; and a modulation control section for providing a modulation pattern, associated with the photosensitive area that has been selected by the photosensor selecting section, for the spatial light modulator.

21 Claims, 7 Drawing Sheets

OPTICAL SENSOR

CROSS-REFERENCE TO RELATED APPLICATIONS

This application is a section 371 of International Application No. PCT/JP2004/001512, filed Feb. 12, 2004, the disclosure of which is incorporated herein by reference.

TECHNICAL FIELD

The present invention relates to an optical detection system including a spatial light modulator and more particularly relates to an optical detection system having the function of controlling an image being formed on its photodetector.

BACKGROUND ART

Generally speaking, a compound lens, consisting of any number of lenses in any of various combinations (e.g., seven lenses in six groups or eleven lenses in ten groups), is often used in an imaging optical system such as a camera. According to a paraxial theory, such a compound lens is equivalent to a single convex lens. However, such approximation is accurate enough only within a relatively narrow range near the optical axis. Accordingly, in actually handling a rather big image, an aberration associated with an angle of view is a problem. Also, in treating multiple wavelengths as in a color image, a chromatic aberration is a problem.

To reduce such aberrations, various combinations of refractive indices and optical surface shapes have been proposed for use in lenses to make up a compound lens. However, to minimize the aberration associated with the angle of view and the chromatic aberration over the entire area of a photodetector, the compound lens needs to consist of a lot of lenses, which increases the overall cost of the required members, the assembling and adjustment costs, and the size of the optical instrument, too.

In order to reduce the overall size of a lens system, it is effective to increase the refractive powers of respective lenses. However, the aberrations resulting from the angle of view and the difference in wavelength would rather increase by doing just that. Nevertheless, if the number of lenses to make up the compound lens were increased to avoid that situation, then the optical instrument would get too much complicated or bulky.

As can be seen, reduction of the aberrations and simplification of the optical system are contradictory purposes, which are hard to achieve at the same time and are still key issues in optics design of today.

Also, in a zoom lens optical system, for example, the aberrations must be reduced with the magnification of imaging changed, thus making it even more difficult to simplify and downsize the optical system.

Furthermore, not just the lens system but also a light quantity control mechanism such as a diaphragm and a shutter increase the size of an optical instrument. This is particularly remarkable in an optical system with a compound lens consisting of a lot of lenses such as a wide-angle lens or a zoom lens. However, depending on the angle of incidence of a bundle of rays entering a lens, the bundle of rays may pass just a portion of each lens, thus making it difficult to design and arrange the optical elements so as to adjust the light quantity uniformly over the entire area of the photodetector. For example, the diaphragm must be arranged at a position where the illumination can be changed at the same ratio as the center portion over the entire area of the photodetector. This condition imposes a constraint in designing an optical system.

The presence of such a light quantity control mechanism and the constraints on its arrangement constitute another obstacle to simplifying and downsizing the optical system.

Meanwhile, not only conventional passive optical elements with fixed optical surfaces such as a glass lens or a prism but also active optical elements with deformable optical surfaces have been developed recently.

Examples of those active optical elements include an optical element that uses a lens with an encapsulated transparent liquid as a variable-focus lens by getting the lens driven by a piezoelectric element (see, for example, Japanese Laid-Open Publication No. 2001-257932, which will be referred to herein as "Document No. 1"). Document No. 1 discloses a configuration in which multiple images are sampled with the focal point of this variable-focus lens switched at high speed and an image that is in best focus with the object is extracted by an image processing technique, thereby obtaining an all in focus image. This Patent Document No. 1 also discloses a configuration for correcting the shift of an image (e.g., variation in magnification and distortion of the image) resulting from a variation in focal length.

Also, in another proposed configuration, a deformable mirror called "Digital Micromirror Device" (DMD, a product name) is provided on the optical path of an imaging optical system and the number of ON-state mirrors or the time of their ON-state periods is controlled, thereby making up an optical diaphragm device (see, for example, Japanese Laid-Open Publication No. 11-231373, which will be referred to herein as "Document No. 2"). This Document No. 2 discloses a configuration for obtaining an arbitrary aperture shape by controlling the mirror driving pattern.

However, the conventional configurations described above have the following drawbacks.

Firstly, only a few types of aberrations can be corrected and reduction of the aberrations over the entire area of the photodetector and simplification of the optical system are hard to realize at the same time. Document No. 1 does disclose a configuration that can be used effectively to correct the focal point shifting and image distortion but does not disclose any configuration for reducing aberrations of different modes such as coma aberration and astigmatism. For example, the aberration associated with the angle of view is mostly a coma aberration or astigmatism, which is hard to correct effectively by the configuration disclosed in Document No. 1. Likewise, a chromatic aberration due to a wavelength difference or an aberration caused by a change of the magnification of imaging includes a lot of components that can never be corrected just by changing the focal length, and is also hard to correct effectively according to the configuration disclosed in Document No. 1.

Accordingly, even when the configuration of Document No. 1 is adopted, a compound lens consisting of almost the same number of lenses is also needed to reduce the angle-of-view aberration and chromatic aberration over the entire area of the photodetector. Consequently, reduction of the aberrations and simplification of the optical system are still difficult to achieve at a time to virtually the same degree. Document No. 2 does not provide any particular configuration for overcoming this problem, either.

Secondly, the aberration correcting mechanism and light quantity control mechanism are both required, thus making it difficult to simplify the optical system. In the configuration of Document No. 2, an imaging optical system with a compound lens consisting of a lot of lenses is provided as the aberration correcting mechanism and a DMD and its driver circuit are provided as the light quantity control mechanism. These are separately provided as independent mechanisms for fulfilling distinct purposes. And Document No. 2 discloses no configuration that can function as both of these two mechanisms at the same time. Thus, the presence of these two mechanisms increases the number of members required, the complexity of the assembling and adjustment processes, and the overall cost and size of the entire optical system. Document No. 1 does not provide any particular configuration for overcoming this problem, either.

Thirdly, it is difficult to reduce the size of the optical system due to the constraint on the arrangement of the light quantity control mechanism. In the configuration of Document No. 2, the quantity of the incoming light is controlled by getting the incoming light deviated by the DMD out of the range of the photodetector. However, to deviate the incoming light totally outside of the photodetector, at least a certain distance must be provided between the photodetector and the DMD. This distance heavily depends on the angle of deviation caused by the DMD and the size of the photodetector, which makes it difficult to downsize the optical system.

Furthermore, in the configuration of Document No. 2, the incoming light is once converged toward a point, where the DMD is provided as a diaphragm. Thus, the overall optical system has an increased size. In Document No. 2, the constraint on the arrangement of the diaphragm to control the light quantity uniformly over the entire area of the photodetector interferes with the desired downsizing. In this respect, Document No. 2 discloses any particularly effective means for improvement. Document No. 2 discloses a configuration for obtaining an arbitrary aperture shape by controlling the mirror driving pattern. However, it is impossible to independently control the light quantities for respective areas of the photodetector with only one aperture shape. Thus, the non-uniformity of the light quantity control cannot be eliminated essentially. Document No. 1 does not provide any particular configuration for overcoming this problem, either.

It should be noted that Japanese National Phase Publication No. 2002-525685 discloses a technique of getting light rays, which have come from multiple different portions of an object, sequentially imaged on a single photosensitive region one after another but still cannot overcome the problems described above.

In order to overcome the problems described above, an object of the present invention is to provide an optical detection system, which can reduce the aberrations over the entire area of the photodetector, can control the light quantity appropriately, and can simplify the optical system at the same time.

DISCLOSURE OF INVENTION

An optical detection system according to the present invention includes: a spatial light modulator for modulating the phase of incoming light; a photodetector having a plurality of photosensitive areas to receive the light of which the phase has been modulated by the spatial light modulator; a photosensor selecting section for selecting at least one of the photosensitive areas and activating the selected photosensitive area effectively; and a modulation control section for providing a modulation pattern, associated with the photosensitive area that has been selected by the photosensor selecting section, for the spatial light modulator.

In one preferred embodiment, the photosensor selecting section cyclically switches the photosensitive areas to select by a time sequential technique, and synchronously with this switching operation, the modulation control section provides a modulation pattern, which produces appropriate imaging ability in the photosensitive area selected, for the spatial light modulator.

In another preferred embodiment, the modulation control section picks one of a plurality of prepared modulation patterns according to the photosensitive area selected.

In another preferred embodiment, the spatial light modulator is arranged on an optical path of an imaging optical system.

In another preferred embodiment, the incoming light entering the spatial light modulator includes light rays with multiple different wavelengths.

In another preferred embodiment, the photosensor selecting section chooses, as light to be modulated, a light ray falling within a particular wavelength range from the light rays with the multiple wavelengths.

In another preferred embodiment, the photosensor selecting section cyclically switches the light rays to choose by a time sequential technique, and synchronously with this switching operation, the modulation control section provides a modulation pattern, which produces appropriate imaging ability with respect to the light ray chosen, for the spatial light modulator.

In another preferred embodiment, the imaging optical system selectively exhibits one of multiple types of imaging characteristics. The optical detection system further includes an imaging information sensing section for sensing information about the imaging characteristic that has been selected from the multiple types of imaging characteristics. In accordance with the output of the imaging information sensing section, the modulation control section provides a modulation pattern, which produces an appropriate imaging ability, for the spatial light modulator.

In another preferred embodiment, the imaging characteristic is an imaging magnification.

In another preferred embodiment, the modulation control section provides a modulation pattern, which deviates the incoming light that has entered at least a portion of the spatial light modulator out of the photosensitive area selected, for the spatial light modulator.

In another preferred embodiment, the modulation control section provides a modulation pattern, which changes the area of that portion of the spatial light modulator, for the spatial light modulator.

In another preferred embodiment, the modulation control section selectively provides either a first modulation pattern, which makes the area of that portion of the spatial light modulator relatively large, or a second modulation pattern, which makes the area of that portion of the spatial light modulator relatively small, for the spatial light modulator, and controls the respective durations of the first and second modulation patterns.

In another preferred embodiment, the light that has been deviated out of the photosensitive area selected is incident on another photosensitive area of the photodetector.

In another preferred embodiment, the optical detection system further includes a position change detecting section for detecting a change of the position of the optical detection system. In accordance with the output of the position change detecting section, the modulation control section generates a modulation pattern that compensates for a shift in focal point caused by the position change.

In another preferred embodiment, each of the photosensitive areas in the photodetector has a plurality of pixels arranged at a pitch, and the modulation control section provides a modulation pattern, which focuses the incoming light at multiple points that are shifted from each other by a distance corresponding to the pixel pitch of the photodetector, for the spatial light modulator.

In another preferred embodiment, the spatial light modulator is a deformable mirror.

In another preferred embodiment, the deformable mirror includes: a plurality of light reflecting areas that are arranged on a substrate; and an actuator for displacing the light reflecting areas at least perpendicularly to the substrate.

In another preferred embodiment, the deformable mirror is coupled to multiple actuators that are associated with the respective light reflecting areas. By driving the actuators independently of each other, the light reflecting areas are displaced perpendicularly to the substrate and/or tilted with respect to the substrate.

In another preferred embodiment, the spatial light modulator is a liquid crystal element.

In another preferred embodiment, each of the photosensitive areas of the photodetector includes a photoelectric modulating section. The optical detection system further includes: a memory for storing the outputs of the photoelectric modulating section in the photosensitive area that has been selected by the photosensor selecting section; and a reconstructing section for reconstructing an overall image by rearranging the outputs stored in the memory.

In another preferred embodiment, the photodetector is a storage medium, of which a physical property changes when exposed to a radiation, and includes a shutter member that allows the photosensor selecting section to selectively transmit or cut off the incoming light.

In another preferred embodiment, the spatial light modulator functions as an optical low pass filter.

Another optical detection system according to the present invention includes: a spatial light modulator for modulating the phase of incoming light including multiple light rays with different wavelengths; a photodetector for selectively receiving the light, of which the phase has been modulated by the spatial light modulator, according to its wavelength; a photosensor selecting section for selecting the wavelength of the effective light ray to receive from the multiple wavelengths; and a modulation control section for providing a modulation pattern, associated with the wavelength that has been selected by the photosensor selecting section, for the spatial light modulator.

Still another optical detection system according to the present invention includes: a spatial light modulator, which is provided on an optical path of an imaging optical system that selectively exhibits one of multiple types of imaging characteristics so as to modulate the phase of incoming light; a photodetector for receiving the light of which the phase has been modulated by the spatial light modulator; an imaging information sensing section for sensing information about the imaging characteristic that has been selected from the multiple types of imaging characteristics; and a modulation control section for providing a modulation pattern for the spatial light modulator in accordance with the output of the imaging information sensing section.

The imaging characteristic is an imaging magnification.

Yet another optical detection system according to the present invention includes: a spatial light modulator, which is provided on an optical path of an imaging optical system so as to modulate incoming light; a modulation control section for providing a plurality of modulation patterns for the spatial light modulator; a photodetector having a plurality of photosensitive areas to receive the incoming light that has been modulated by the spatial light modulator; and a photosensor selecting section for selecting one of the photosensitive areas to receive the light effectively. The modulation control section generates a modulation pattern to control the quantity of the incoming light for the photosensitive area that has been selected by the photosensor selecting section.

In one preferred embodiment, the optical detection system further includes a light quantity detecting section for detecting the respective quantities of light received by the photosensitive areas, and the modulation control section generates the modulation pattern in accordance with the output of the light quantity detecting section.

BEST MODE FOR CARRYING OUT THE INVENTION

EMBODIMENT 1

Hereinafter, an optical detection system according to a first preferred embodiment of the present invention will be described with reference to FIGS. 1 through 6.

Figure 1:
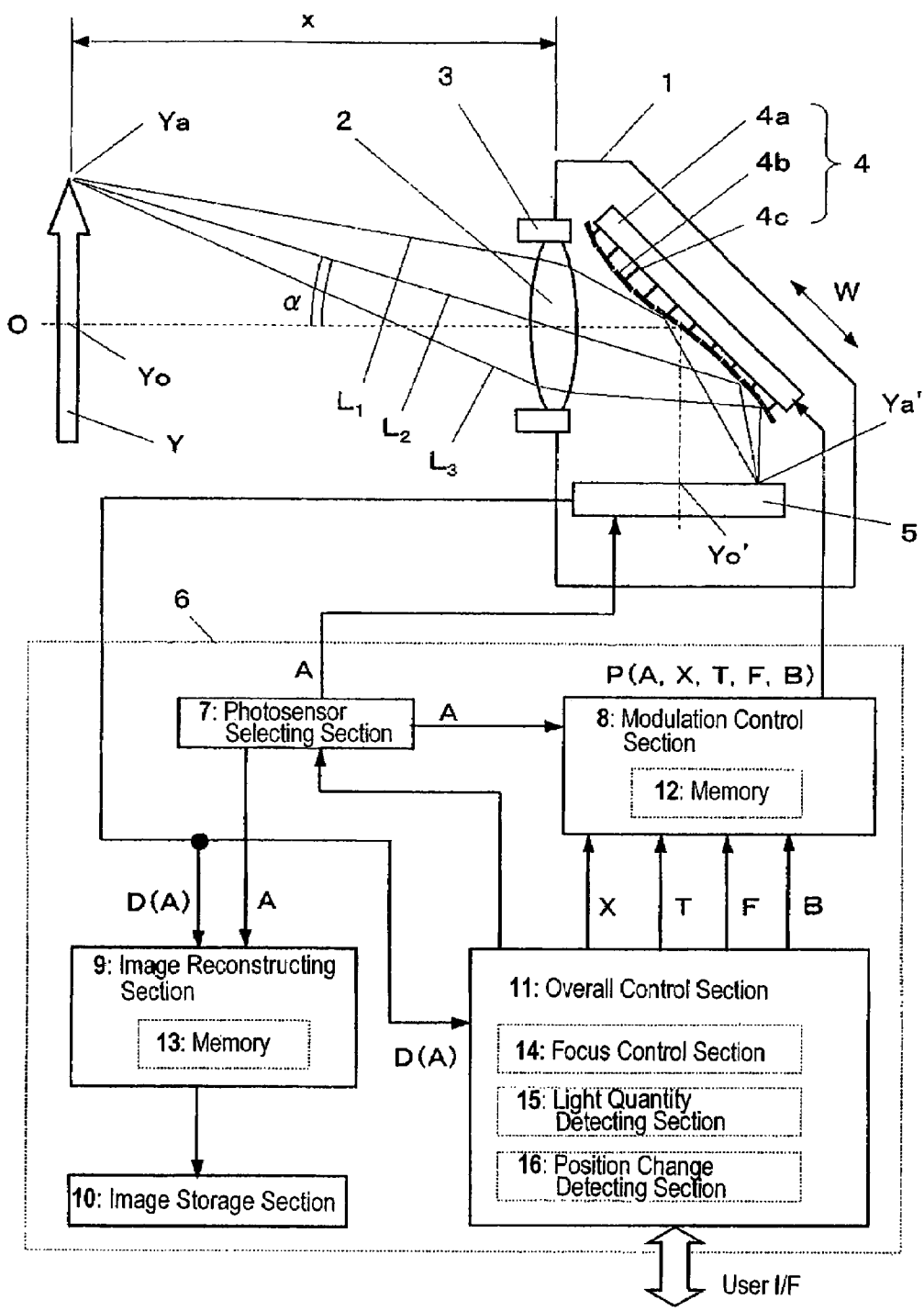
FIG. 1 is a diagram schematically showing a configuration for an optical detection system according to a first preferred embodiment of the present invention.

First, referring to FIG. 1, illustrated is a schematic configuration for an optical detection system according to this preferred embodiment. In the housing 1 of the optical detection system shown in FIG. 1, a lens 2, a lens moving mechanism 3, a deformable mirror 4, a photodetector 5, and a controller 6 are provided. As shown as a block diagram in FIG. 1, the controller 6 includes a photosensor selecting section 7, a modulation control section 8, an image reconstructing section 9, an image storage section 10 and an overall control section 11.

The lens 2 is an objective lens for condensing the light that has come from an object Y, which is the target to be imaged. After having passed through the lens 2, the incoming light has its phase modulated by the deformable mirror 4 functioning as a spatial light modulator. Then, the incoming light is reflected by the deformable mirror 4 and converged on the photodetector 5. FIG. 1 illustrates a state in which incoming light that has come from a point Ya on the object Y is focused at a point Ya' on the photodetector 5. In this case, the distance from the optical detection system to the object Y is supposed to be x and the angle of the incoming light is supposed to be α. Three possible optical paths L1, L2 and L3 of the incoming light reaching the point Ya' from the point Ya are also shown in FIG. 1. To produce an image of the point Ya at the point Ya' clearly, all optical paths, including the three optical paths L1, L2 and L3, may have an identical optical path length. Alternatively, the optical path lengths may also be defined so as to be different from each other by an integral multiple of the wavelength. That is to say, it is only necessary that the phases of incoming light rays, starting from the point Ya and traveling along those paths, match with each other at the point Ya'. This condition is satisfied herein by deforming the deformable mirror 4. The target values of deformation at respective points on the deformable mirror 4 may be calculated as functions of only α and x. Thus, in this preferred embodiment, those values are stored as a table and the α—and x-related values are read out as an address. There are five functions of the deformable mirror 4 as spatial light modulator. One of the five is this aberration correcting function and the other four are a shuttering function, a stopping function, an optical low pass filter function and a blurring correcting function. These functions will be described in further detail later.

The lens 2 is designed so as to have such a surface shape that when the deformable mirror 4 is not deformed (i.e., has a flat plane surface), a point Yo of the object Y near the optical axis O is rather well imaged at a point Yo' on the photodetector 5.

The lens moving mechanism 3 moves the lens 2 back and forth along the optical axis O, thereby controlling the focal point.

The deformable mirror 4 is obtained by arranging a lot of deformable micromirrors 4b on a substrate 4b. This deformable mirror may be implemented with the configuration that the applicant of the present application disclosed in the previous related PCT International Application No. PCT/JP02/12344. Each of those micromirrors 4b has a very small reflective plane, which may be either about 100-200 μm square or rectangular (of which the longer side is defined in the W direction). The micromirrors 4b are arranged as a two-dimensional array with a gap of about 1 μm provided between two adjacent micromirrors, thereby defining an overall reflective plane. The displacement of those micromirrors 4b perpendicular to the substrate 4a and/or the tilt of the micromirrors 4b with respect to the substrate 4a may be controlled independently of each other by the actuators 4c connected to the respective back surfaces of the micromirrors 4b.

Figure 2:
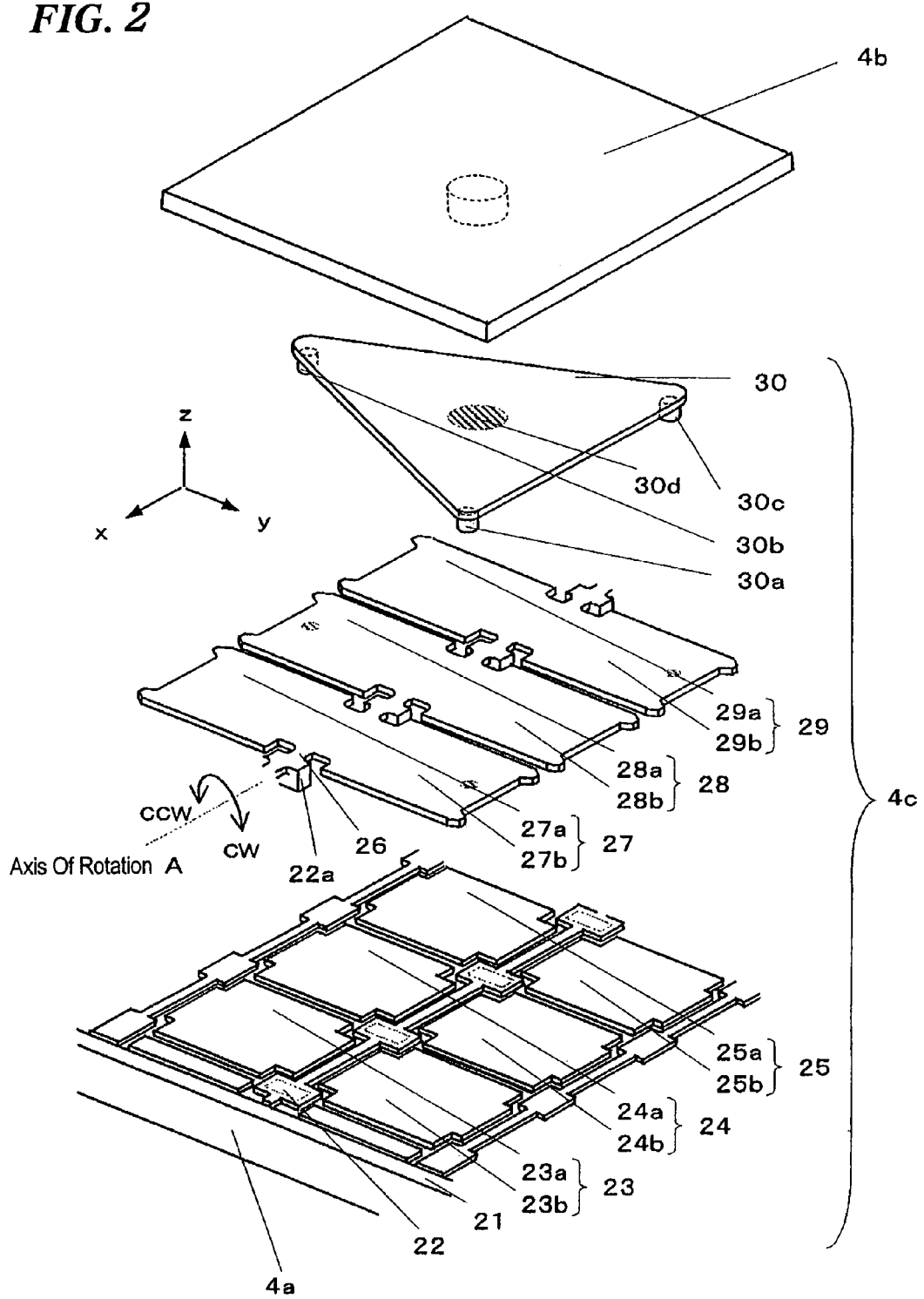
FIG. 2 is an exploded perspective view of a deformable mirror according to the first preferred embodiment of the present invention.

This deformable mirror 4 will be described more fully with reference to FIG. 2, which is an exploded perspective view of the deformable mirror 4 according to the first preferred embodiment of the present invention. In FIG. 2, just one micromirror 4b and its associated actuator 4a are illustrated on a large scale.

As the fixed portion of the actuator 4c, an insulating layer 21 is provided on a substrate 4a and a base 22 and fixed electrodes 23, 24 and 25 are arranged on the insulating layer 21. The base 22 and fixed electrodes 23 to 25 are formed by patterning a conductive film of aluminum (Al), polysilicon or any other suitable material. Each of these fixed electrodes 23, 24 and 25 is divided into two fixed-electrode pieces 23a & 23b, 24a & 24b and 25a & 25b. These fixed-electrode pieces 23a, 23b, 24a, 24b, 25a and 25b are connected to the driver circuit on the substrate 4a by way of via metals (not shown), which are provided in the insulating layer 21. The driver circuit can apply mutually independent voltages, all of which fall within the range of 0 V to 5 V, to the fixed-electrode pieces 23a, 23b, 24a, 24b, 25a and 25b. Each of the voltages applied to these six fixed-electrode pieces 23a, 23b, 24a, 24b, 25a and 25b may be set to a multi-bit value of around 16 bits, for example. On the other hand, the base 22 is grounded. A portion of the base 22 functions as a supporting post 22a for supporting the movable electrodes.

As the movable portion of the actuator 4c, yokes 27, 28 and 29 are secured to the supporting post 22a via a hinge 26. Furthermore, an intermediate coupling member 30 for coupling these yokes 27, 28 and 29 to the micromirror 4b is also provided.

These yokes 27, 28 and 29 face their associated fixed electrodes 23, 24 and 25, respectively, so as to function as "movable electrodes". The yokes 27, 28 and 29 are formed by patterning an electrically conductive material such as aluminum (Al) or polysilicon, and are electrically continuous with the base 22 so as to have the ground potential. Each of these yokes 27, 28 and 29 has a first portion 27a, 28a or 29a and a second portion 27b, 28b or 29b, which respectively face the fixed-electrode pieces 23a & 23b, 24a & 24b and 24a & 25b. For example, if a drive voltage is applied to the fixed-electrode piece 23a for the yoke 27, then the first portion 27a will be attracted toward the fixed-electrode piece 23a. On the other hand, if a drive voltage is applied to the fixed-electrode piece 23b, then the second portion 27b will be attracted toward the fixed-electrode piece 23b. In this manner, the rotational force can be produced around the axis A of rotation either clockwise CW or counterclockwise CCW. The same statement applies to the other yokes 28 and 29, too.

The intermediate coupling member 30 includes three protrusions 30a, 30b and 30c, which are coupled to the second portion 27b of the yoke 27, the first portion 27a of the yoke 28 and the second portion 29b of the yoke 29, respectively. Accordingly, by driving and rotating the yokes 27, 28 and 29 independently of each other, the displacements of the protrusions 30a, 30b and 30c are controllable independently and the position of the intermediate coupling member 30 is fixed. The micromirror 4b and intermediate coupling member 30 are coupled together at the hatched portion 30d, which is approximately the center portion of the intermediate coupling member 30. Thus, the position of the intermediate coupling member 30 defines the position of the micromirror 4b. As is clear from the foregoing description of the configuration of this preferred embodiment, by applying drive voltages selectively and independently to the fixed-electrode pieces 23a, 23b, 24a, 24b, 25a and 25b, the micromirror 4b can be driven bidirectionally (i.e., positive and negative directions), no matter whether the micromirror 4b needs to be displaced in the z direction or tilted around the x axis and/or y axis.

The deformable mirror 4 will be further described with reference to FIG. 1 again.

FIG. 1 illustrates a state where each micromirror 4b and its adjacent micromirrors have similar degrees of displacement on their peripheries so as to form a continuum (i.e., so that the overall reflective surface defines one continuous curved surface). This curved surface may be defined so as to have any arbitrary shape and functions as a reflective mirror of which the surface shape is controllable actively. Naturally, it is possible to control the displacement such that each micromirror 4b and its adjacent micromirrors have different degrees of displacement on their peripheries so that the overall reflective surface is discontinuous. The respective positions of the micromirrors 4b may be controlled independently of each other. Accordingly, the deformable mirror 4 may also function as a diffraction grating of any of various shapes, and can control the quantity and focal point of the diffracted light on an order-by-order basis by changing its shape. By controlling the degrees of displacement of the respective micromirrors 4b in this manner, the incoming light 8 can have its optical path length changed and can be subjected to any arbitrary phase conversion. As to the target values of displacement of these micromirrors 4b (i.e., as to the modulation pattern of the deformable mirror 4), a number of modulation patterns are prepared and stored in a memory 12 provided for the modulation control section 8. And when an address A specifying a photosensitive area is output from the photosensor selecting section 7 and when distance data X, shuttering time data T, stopping data F, and position change detection data B are output from the overall control section 11, their associated modulation pattern P (A, X, T, F, B) is read out. As already described, the target value of deformation of the deformable mirror 4 to achieve appropriate imaging performance can be determined by the angle α and distance x. The address A represents the angle α and the distance data X represents the distance x. The shuttering time data T, stopping data F and position change detection data B will be described in detail later.

On the substrate 4a of the deformable mirror 4, provided is a driver circuit for applying a drive voltage to the respective actuators 4c in accordance with the modulation pattern P (A, X, T, F, B) supplied from the modulation control section 8. In this preferred embodiment, the displacement of the respective micromirrors 4b is controlled as a closed loop, and a drive voltage calculated based on the target degree of displacement is applied to each actuator 4a, thereby realizing a multistage displacement of the micromirrors 4b.

The photodetector 5 is implemented as a CCD image sensor or a CMOS image sensor in which pixels are arranged as a two-dimensional array.

Figure 3:
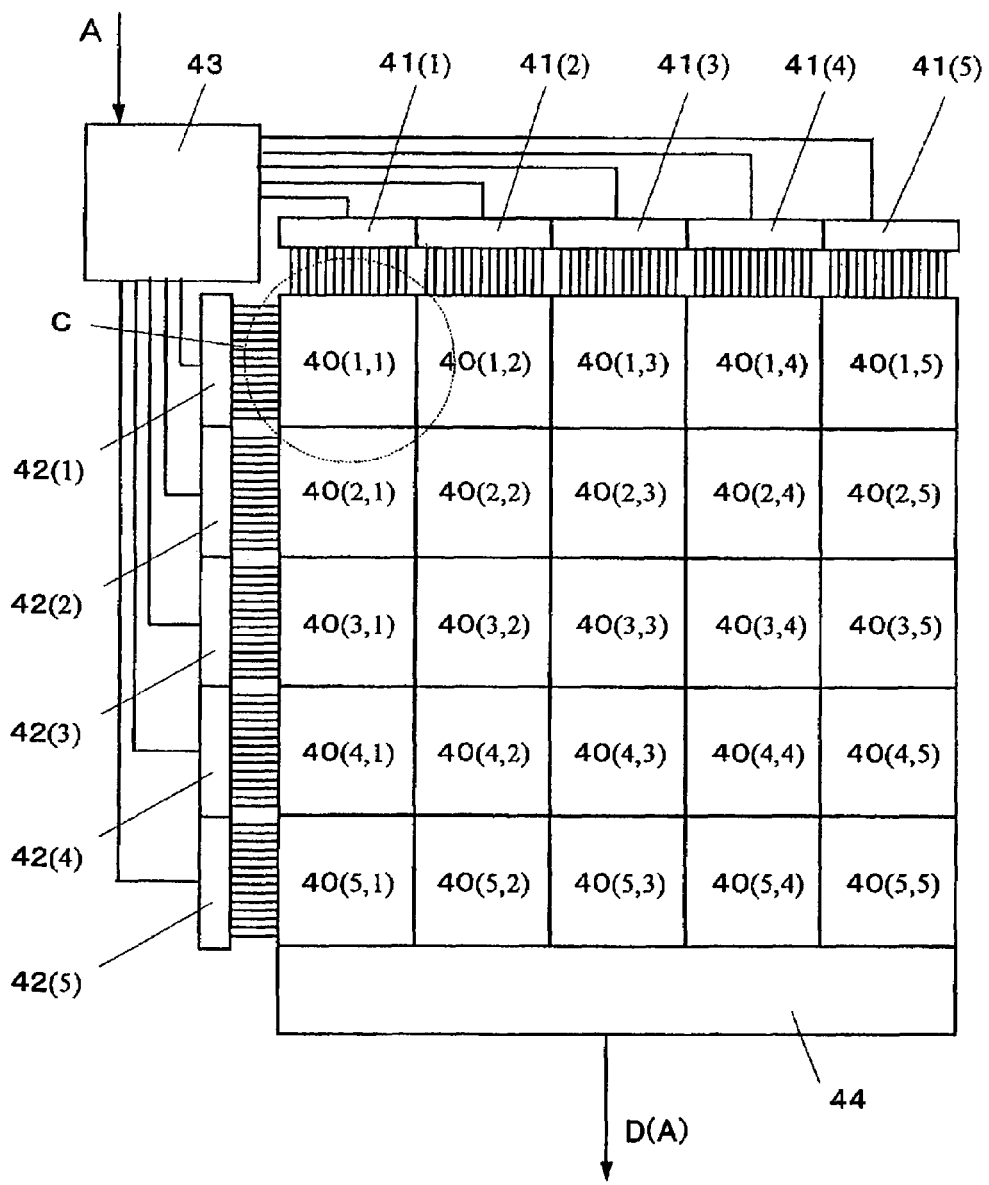
FIG. 3 is a diagram showing a configuration for a photodetector according to the first preferred embodiment of the present invention.

Next, the photodetector 5 will be described in detail with reference to FIG. 3, which shows a schematic configuration for the photodetector of this preferred embodiment.

The photodetector 5 includes 1280×1280 pixels in total. The photosensitive region 40 of the photodetector 5 is divided into five horizontally and five vertically. Each of these 5×5 photosensitive areas 40(1, 1) through 40(5, 5) includes 256×256 pixels and can be accessed on an area-by-area basis. For that purpose, the same number of horizontal scanning circuits 41(1) through 41(5) as the horizontal division number of the photosensitive region 40 and the same number of vertical scanning circuits 42(1) through 42(5) as the vertical division number of the photosensitive region 40 are provided.

An area selector 43 receives the address A from the photosensor selecting section 7, and selects one of the photosensitive areas to activate. Supposing i and j are natural numbers of 1 to 5 and each photosensitive area is represented by 40(i, j), the address A includes data specifying these i and j values. More specifically, the area selector 43 picks one horizontal scanning circuit 41(j) and one vertical scanning circuit 42(i) that are associated with the photosensitive area 40(i, j) to activate, and sequentially scans the 256×256 pixels included in that area. The outputs of the photodiodes of the respective pixels are amplified and digitized by a processor 44, thereby obtaining output data D(A). The output data D(A) means a sequence of data representing all pixels of the photosensitive area specified by the address A.

While an imaging operation is being carried out at the photosensitive area 40(i, j), the shape of the reflective surface of the deformable mirror 4 is controlled such that the incoming light has the smallest aberration at the center of the photosensitive area 40(i, j) during the imaging operation. Suppose the imaging operation is now being carried out at the photosensitive area 40(1, 1). In that case, appropriate imaging performance is achieved within the dashed circle C including the photosensitive area 40(1, 1). Synchronously with the operation of selecting the photosensitive area 40(i, j) in which the imaging operation should be carried out, the area with appropriate imaging performance as indicated by the dashed circle C is defined on the photosensitive area 40(i, j). Accordingly, an image with appropriate imaging performance can be obtained over all photosensitive areas. To acquire an image corresponding to one frame, the output data D may be sequentially obtained from all of the 25 photosensitive areas in the order of 40(1, 1), 40(1, 2), 40(1, 3), . . . and 40(5, 5). Optionally, those photosensitive areas may be selected at random as well. As another alternative, imaging may also be carried out with only a required range selected from one frame. For example, to pick up a moving picture, motion estimation may be performed on every photosensitive area. However, if the variation from the previous frame image is less than a predetermined level in a photosensitive area, then the imaging operation for the next frame may be omitted but the image data for the current frame may be used as it is. In any case, the modulation pattern P is selected synchronously with the photosensitive area selecting operation such that the deformable mirror 4 always provides appropriate imaging performance for the photosensitive area that performs detecting operation effectively.

The number of modulation patterns P will be described. The photosensitive areas 40(1, 1), 40(1, 5), 40(5, 1) and 40(5, 5) are arranged so as to have rotation symmetry. In the same way, their associated modulation patterns P(A, X, T, F, B) also have rotation symmetry as to a parameter of the address A. Accordingly, if one modulation pattern P(A, X, T, F, B) is rotated 90 degrees, for example, another modulation pattern P(A', X, T, F, B) may be obtained. By utilizing such symmetry, the number of modulation patterns to be stored in the memory 12 can be reduced to as small as 5 against 25 addresses A, for example.

Also, as described above, if the surface of the deformable mirror 4 is kept flat without being deformed, appropriate imaging performance is supposed to be achieved at the photosensitive area 40(3, 3), which is located at the center of all photosensitive areas 40(1, 1) through 40(5, 5). While a focus control operation is being carried out by the lens moving mechanism 3, the lens 2 is moved to a location with the highest pixel-to-pixel contrast by using this photosensitive area 40(3, 3).

Referring back to FIG. 1, the overall configuration of the optical detection system will be further described.

During an imaging operation for one frame, the photosensor selecting section 7 sequentially switches the address A values, thereby obtaining the output data D(A) from all of the 25 photosensitive areas. In picking up a moving picture, this operation is repeatedly performed. As described above, the address A is output to the photodetector 5 and modulation control section 8, thereby synchronizing the imaging operation by the photodetector 5 and the incoming light modulating operation by the deformable mirror 4 with each other. Furthermore, the address A is output to the image reconstructing section 9, too.

The modulation control section 8 generates the modulation pattern P(A, X, T, F, B) to drive the deformable mirror 4. The modulation pattern P(A, X, T, F, B) represents a target degree of deformation of each micromirror 4b and is a function of the address A supplied from the photosensor selecting section 7 and the distance data X, shuttering time data T, stopping data F and position change detection data B supplied from the overall control section 11. In the memory 12 of the modulation control section 8, modulation patterns P(A, X) for correcting an aberration, produced when an address A and distance data X are given, to realize appropriate imaging performance are calculated or obtained in advance via experiments and stored. These modulation patterns are stored as a table of correspondence between the addresses A and distance data X. Thus, in response to the given address A and distance data X, their associated modulation pattern P(A, X) is read out. This modulation pattern P(A, X) is further modulated by the modulation control section 8 in accordance with the shuttering time data T, stopping data F and position change detection data B, thereby generating the modulation pattern P(A, X, T, F, B) finally.

The image reconstructing section 9 receives the address A from the photosensor selecting section 7 and the output data D(A) from the photodetector 5, respectively, so as to reconstruct an image corresponding to one frame. The output data D(A) of the photosensitive area, specified by the address A, is temporarily stored in a memory 13. When the output data of all of the photosensitive areas are accumulated there, those output data are merged with each other, thereby making up one complete image. The image data compression processing is also carried out by the image reconstructing section 9. The data compression processing may be selectively performed by one of the following two methods. Specifically, according to one method, a full-screen non-compressed image is obtained by merging together the non-compressed image portions supplied from the respective photosensitive areas and then subjected to data compression. In the other method, the respective image portions are subjected to image compression such as a two-dimensional DCT in the respective photosensitive areas and then merged together. The second method is advantageous in that the capacity of the memory 13 can be cut down and that the processing rate can be increased. After having been subjected to data compression by any of these two methods, the full-screen image is stored in the image storage section 10. The image storage section 10 is a removable memory such as a flash memory card.

The overall control section 11 includes a focus control section 14, a light quantity detecting section 15 and a position change detecting section 16 and controls the overall operation of the optical detection system.

The focus control section 14 controls the lens moving mechanism 3 to move the lens 2 to an in-focus position according to the distance x between this optical detection system and the object Y. The lens position may be adjusted by directly measuring the distance x with a range finder. However, in this preferred embodiment, the lens 2 is moved to a position near the optical axis, at which the contrast in the photosensitive area becomes the highest with the deformable mirror 4 kept flat. The focus control section 14 outputs the information about the position of the lens 2 in such a situation as the distance data X on the distance x.

The light quantity detecting section 15 is an exposure meter, which adopts a matrix photometry method and which detects the quantities of light at a plurality of photometric points, thereby making illuminance data. The photometric points, at which the light quantity detecting section 15 measures the light quantities, are associated with the respective photosensitive areas of the photodetector 5. In this preferred embodiment, 25 (=5×5) photometric points are provided. The outputs from these photometric points are handled as illuminance data I(A) so as to be associated with the addresses A. Also, either "stopping preferred" or "shutter speed preferred" is selectively input through a user interface (I/F) to the overall control section 11, thereby inputting a stopping value or a shutter speed value. Based on these data and the illuminance data I(A), the shuttering time data T(A) and stopping data F(A) are determined for each photosensitive area. The shuttering time data T(A) and stopping data F(A) may be either constant irrespective of the addresses A or variable with the addresses A. As a result, the light quantity control can be carried out much more flexibly. Thus, uniform light quantity control over the entire photodetector 5 can be achieved more easily. Furthermore, even in an image that has such a big difference in brightness within itself to maintain an appropriate dynamic range easily, it is possible to effectively prevent that image from being whitened or blackened entirely by controlling the light quantity on a photosensitive area basis. Alternatively, the overall control section 11 may also be designed so as to allow the user to pick the "stopping preferred" option or the "shutter speed preferred" option on an image area basis. In that case, a picture of a special type can be created by bringing about different effects on respective photosensitive areas. For example, some photosensitive areas may give an impression of gentle flow with the shutter speed decreased, while other photosensitive areas within the same picture may give an impression of a series of instantaneous photos that were taken with the shutter speed increased.

In order to correct the blurring, the position change detecting section 16 detects the position change of the housing 1. The position change detecting section 16 includes two angular velocity sensors (not shown), which respectively detect the pitching and yawing angular velocities of the housing 1. These angular velocity outputs are integrated together by an integrator, thereby calculating position change detection data B about the change in the position of the housing 1 at regular intervals as the total positional change from the start of imaging. The position change detection data B calculated in this manner is output to the modulation control section 8.

Hereinafter, it will be described how the optical detection system having such a configuration operates.

When the shutter button (not shown) is pressed down halfway, the overall control section 11 performs a focus control first. Specifically, the overall control section 11 gets the lens 2 slightly moved forward or backward by the lens moving mechanism 3, thereby searching for a position near the optical axis of the photodetector 5 at which the contrast is maximized in the photosensitive region. In this case, no drive voltage is applied to the deformable mirror 4 and the reflective surface of each micromirror 4b is flat. When the position of the lens 2 is controlled at the in-focus position, the distance data X in that situation is generated.

Next, the light quantity detecting section 15 outputs the illuminance data I(A) obtained from the respective photometric points. The overall control section 11 compares the pattern of this illuminance data I(A) with multiple prestored illuminance pattern data, thereby sensing the image situation and picking the shuttering time data T(A) and stopping data F(A) that seem to be the best at this time. These distance data X, shuttering time data T(A) and stopping data F(A) are output to the modulation control section 8.

The preparatory operation that has been carried out in response to the half-pressing of the shutter button is finished in this way. When the shutter button is pressed next time, the overall control section 11 will start an imaging operation. First, the position change detecting section 16 detects the biaxial angular velocities of the housing 1 and integrates together these angular velocity outputs from the imaging start point, thereby outputting position change detection data B.

The photosensor selecting section 7 sequentially switches the addresses A and outputs them to the photodetector 5 and modulation control section 8. In this manner, the respective photosensitive areas of the photodetector 5 are selectively activated effectively, while at the same time, the modulation control section 8 generates a modulation pattern P(A, X, T, F, B) to produce appropriate imaging performance in the respective photosensitive areas. In accordance with the modulation pattern P(A, X, T, F, B) supplied from the modulation control section 8, the deformable mirror 4 displaces the respective micromirrors 4b, thereby modulating the incoming light. Also, the deformable mirror 4 corrects the position of the focal point in accordance with the position change detection data B, corrects the aberration due to the angle of view and so on based on the address A and distance data B, and controls the quantity of light falling on the active photosensitive area according to the shuttering time data T(A) and stopping data F(A).

Furthermore, the photodetector 5 performs a discrete sampling operation in a spatial period to be determined by a pixel-to-pixel pitch. To prevent moiré fringes from being produced due to this aliasing error, the deformable mirror 4 also functions as an optical low pass filter.

Figure 4:
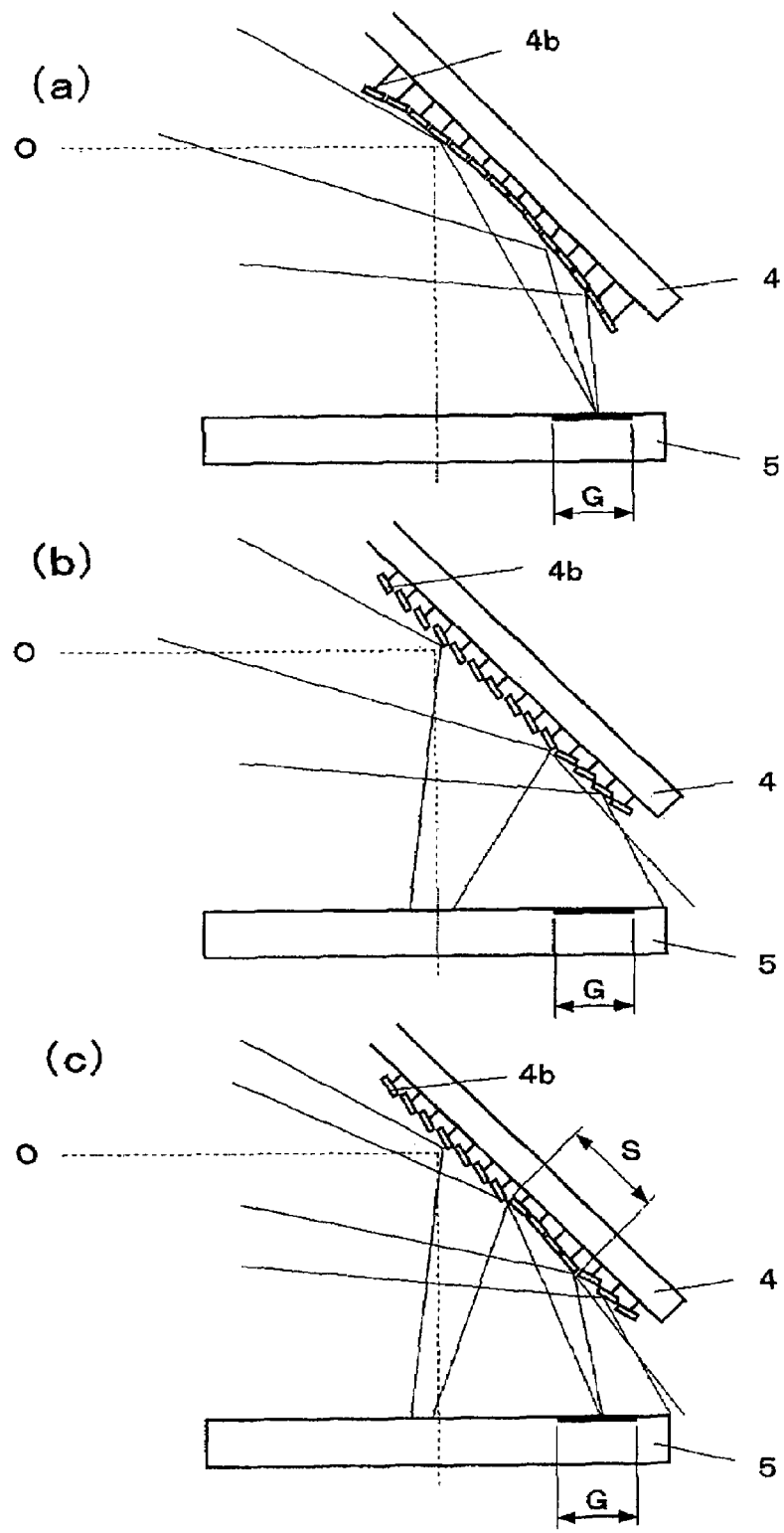
FIG. 4 shows how to operate the diaphragm and shutter of the deformable mirror 4.
Figure 5:
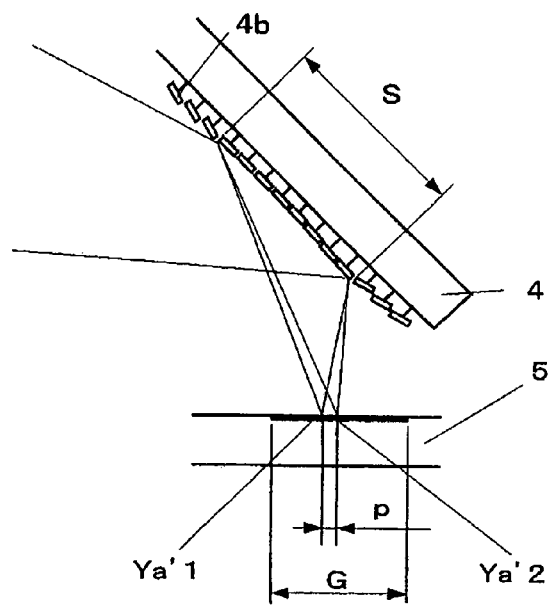
FIG. 5 shows how the deformable mirror 4 functions as an optical low pass filter.
Figure 6:
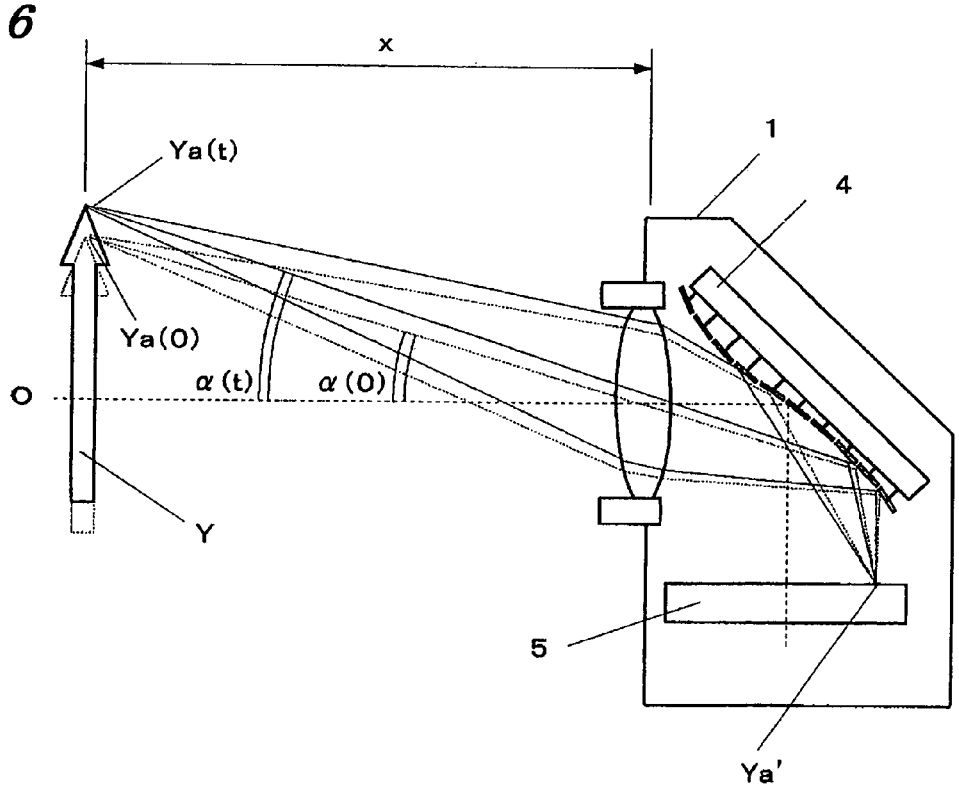
FIG. 6 shows how the deformable mirror 4 corrects blurring.

These stopping, shuttering, low pass filtering and blurring correcting operations of the deformable mirror 4 during the imaging operation will be described with reference to FIGS. 4 through 6. FIG. 4 illustrates how the deformable mirror 4 performs the stopping and shuttering operations.

FIG. 4(a) illustrates a state of the deformable mirror 4 corresponding to an "aperture fully opened" state. In the photodetector 5, an activated photosensitive area thereof, which is carrying out the light detecting operation effectively, will be identified by G. The other area of the photodetector 5, as well as the areas outside of the photodetector 5, will be referred to herein as a "non-photosensitive area". In FIG. 4(a), the respective micromirrors 4b are deformed such that the aberration is minimized at the center of the photosensitive area G. As already described, the condition to realize this state is to determine the optical path lengths so as to equalize the phase conditions of incoming light rays following the respective optical paths. In this case, the deformable mirror 4 does not particularly function as a diaphragm and its state corresponds to the "aperture fully opened" state.

FIG. 4(b) illustrates a state of the deformable mirror 4, which is deviating all incoming light rays outside of the photosensitive area G. The condition to realize this state is to determine the optical path lengths so as to produce mutually canceling interferences within the photosensitive area G because the incoming light rays following the respective optical paths have significantly different phase conditions. For example, the respective micromirrors 4b may be tilted to a tilt angle, which is significantly different from the position shown in FIG. 4(a). Alternatively, the micromirrors 4b may define a blazed diffraction grating, high-order (i.e., higher than the first order) light rays may be deviated outside of the photosensitive area G and their light quantity ratio may be increased up to almost 100%. There are a lot of solutions that realize such a condition. Thus, an appropriate one of them may be selected and adopted as the modulation pattern. As a result, the photosensitive area G can be shielded from the incoming light substantially completely.

The photosensitive area G is just a portion of the entire photosensitive region of the photodetector 5. Accordingly, even if the photodetector 5 and deformable mirror 4 are provided rather close to each other, the incoming light can be deviated toward the non-photosensitive area easily. Thus, compared with the situation where the incoming light must be deviated totally outside of the photodetector 5 as in the conventional optical detection system, the distance between the photodetector 5 and the deformable mirror 4 can be shortened significantly.

FIG. 4(c) illustrates a state of the deformable mirror 4, which is defining an iris diaphragm. Just like the respective micromirrors 4b shown in FIG. 4(a), the micromirrors 4b within an area S of the deformable mirror 4 are deformed such that the aberration is minimized at the center of the photosensitive area G. On the other hand, just like the respective micromirrors 4b shown in FIG. 4(b), the micromirrors 4b outside of the area S of the deformable mirror 4 deviate the incoming light rays outside of the photosensitive area G. Accordingly, this area S corresponds to the aperture of an iris diaphragm, the incoming light ray within this iris reaches the photosensitive area G but the other incoming light rays are substantially cut off. The size of the area S is determined by the stopping data F. Also, the deformable mirror 4 is operated as shown in FIG. 4(c) only within a period of time defined by the shuttering time data T but operated as shown in FIG. 4(b) in the other periods. As a result, the incoming light ray is allowed to reach the photosensitive area G only within the period of time defined by the shuttering time data T and the deformable mirror 4 can function as both an iris diaphragm and a shutter alike.

The aperture size of the iris diaphragm and the shuttering time can be changed on a photosensitive area G basis. Thus, the best aperture size and the best shuttering time can be used for each photosensitive area G. Generally speaking, the iris diaphragm tends to work relatively easily around the center of one's vision but not so easily around the periphery of the vision, although it actually depends on the design of the optical system adopted. Accordingly, if the variation in the aperture size of the iris diaphragm is decreased in photosensitive areas around the center of the photodetector but increased in photosensitive areas around the periphery of the photodetector, the light quantity can be made uniform relatively easily. Naturally, the iris diaphragm shape can be defined arbitrarily. Thus, by optimizing that shape, the light quantity can be made even more uniform.

Next, the optical low pass filtering operation of the deformable mirror 4 will be described with reference to FIG. 5, which illustrates how the deformable mirror 4 functions as an optical low pass filter.

As already described, the micromirrors 4b within the area S of the deformable mirror 4 are deformed so as to minimize the aberration in the photosensitive area G, which is performing a photosensing operation effectively in the photodetector 5. However, to further function as an optical low pass filter, the micromirrors 4b within that area S form two focal points Ya'1 and Ya'2 with respect to an object Ya, speaking microscopically. These two focal points Ya'1 and Ya'2 are separate from each other just by the pixel pitch p of the photodetector 5. As a result, optical signal components falling within a range corresponding to the Nyquist rate of the photodetector 5 are cut off. Consequently, the optical low pass filtering function of reducing the aliasing error of the photodetector 5 during its sampling operation and eliminating the moirés is achieved. To separate the focal point into those two points Ya'1 and Ya'2, some of the micromirrors 4b within the area S may have their position controlled so as to focus the incoming light at the point Ya'1 and the other micromirrors 4b may have their position controlled so as to focus the incoming light at the point Ya'2. This control is also realizable just by changing the modulation pattern P output by the modulation control section 8. Also, the actual focal points are not two but four in three directions, i.e., two focal points along a horizontal line of pixels in the photodetector 5 and two more focal points along two oblique lines of pixels, so that each pair of focal points is separate from each other by a pixel pitch. To achieve the optical low pass filtering function effectively, every focal point within the photosensitive area G needs to be shifted from its adjacent focal point exactly by the pixel pitch p. There is a small difference in the magnitude of this shift between around the center of the activated photosensitive area G and around the periphery thereof. However, if the size of the photosensitive area G is reduced sufficiently, such an error can be reduced to a negligible level.

In the prior art, such an arrangement forming multiple focal points that are shifted from each other by the pixel pitch p is normally realized by combining together birefringent members made of quartz, for example. In contrast, according to the present invention, an optical low pass filter that minimizes the moirés can be obtained without using any special member. Also, the conventional optical low pass filter using those birefringent members requires that the incoming light be non-polarized light. However, according to the present invention, an optical low pass filter that can be always used irrespective of the polarization direction of the incoming light can be provided without being limited by any such constraint.

Next, the blurring correcting operation of the deformable mirror 4 will be described with reference to FIG. 6, which illustrates how the deformable mirror 4 corrects the blurring.

Suppose at the start of imaging operation, an incoming light ray that has come from a point Ya(0) of the object Y enters the system at an angle $\alpha(0)$ and focused at a point Ya' on the photodetector 5. As already described, the angle $\alpha(0)$ is defined by the address A that specifies a selected photosensitive area and the deformable mirror 4 is deformed so as to equalize the phase conditions of incoming light rays following the respective optical paths from the point Ya(0) to the point Ya'.

When the housing 1 changes its direction due to blurring, it seems to the housing 1 as if the object Y had moved.

When an amount of time t passes from the start point of imaging operation, the point Ya(0) will shift to a point Ya(t) and the angle of incidence of the incoming light ray will change by $\alpha(t)-\alpha(0)$. The deformable mirror 4 controls the magnitude of displacement to keep the focal point Ya' unmoved by compensating for that variation $\alpha(t)-\alpha(0)$ in the angle of incidence of the incoming light ray. This control is achieved by deforming the deformable mirror 4 so as to equalize the phase conditions of incoming light rays following the respective optical paths from the point Ya(t) to the point Ya'. The magnitude of displacement satisfying this condition can be obtained substantially automatically when the angular variation $\alpha(t)-\alpha(0)$ is known. And this angular variation $\alpha(t)-\alpha(0)$ is given as the position change detection data B output by the position change detecting section 16. Thus, the modulation control section 8 can generate a modulation pattern for blurring correction based on this position change detection data B.

As described above, just by changing the modulation pattern P(A, X, T, F, B), the deformable mirror 4 can perform the aberration correcting function, stopping function, shuttering function, optical low pass filtering function and/or blurring correcting function simultaneously in an arbitrary combination, thus contributing to significant simplification and size reduction of the overall system. Also, the aperture size of the iris diaphragm and the shuttering time can be defined on a photosensitive area basis. Consequently, the light quantity can be controlled uniformly over the entire area of the photodetector.

As described above, the optical detection system of this preferred embodiment is designed such that the photosensor selecting section 7 selects one of multiple photosensitive areas of the photodetector 5, in which a photosensing operation can be performed effectively, and that the modulation control section 8 generates a modulation pattern that achieves appropriate imaging performance in that photosensitive area. Accordingly, even with a simple optical system, the aberration due to the angle of view can be reduced effectively over the entire area of the photodetector 5.

In addition, in the preferred embodiment described above, the modulation control section 8 is designed so as to control the quantity of light entering the activated photosensitive area G by deviating a portion of the incoming light on the deformable mirror 4 outside of the activated photosensitive area G. Thus, the single deformable mirror 4 can function as both an aberration correcting mechanism and a light quantity control mechanism alike, thereby simplifying the optical system.

Furthermore, in the preferred embodiment described above, the incoming light that has been deviated outside of the activated photosensitive area G is focused on other photosensitive areas of the photodetector 5. Thus, compared with the situation where the incoming light must be deviated totally outside of the photodetector 5 as in the prior art, the distance between the photodetector 5 and the deformable mirror 4 can be shortened significantly and the optical detection system can be downsized.

Furthermore, in the preferred embodiment described above, the modulation control section 8 is designed so as to generate a modulation pattern that compensates for a shift of the focal point in accordance with the output of the position change detecting section 16. Accordingly, the single deformable mirror 4 can function as a blurring correcting mechanism, too, thus further simplifying the optical system.

Furthermore, in the preferred embodiment described above, the modulation control section 8 is designed so as to generate a modulation pattern that focuses the incoming light at multiple points that are separate from each other by the pixel pitch of the photodetector 5. Accordingly, the single deformable mirror 4 can also function as an optical low pass filter, thus further simplifying the optical system.

Furthermore, in the preferred embodiment described above, the optical detection system is designed such that the photosensor selecting section 7 selects the photosensitive area to activate from multiple photosensitive areas of the photodetector 5, and that the modulation control section 8 generates an appropriate opaque pattern for that photosensitive area. Thus, the light quantity can be controlled independently on a photosensitive area basis. Consequently, compared with the situation where the light quantities of all areas of the photodetector are controlled at a time with just one opaque pattern as in the prior art, the constraint on the arrangement and design of the opaque member can be relaxed significantly and the overall system can be downsized.

In the preferred embodiment described above, the address A is used as a piece of information specifying a particular photosensitive area of the photodetector 5 and the modulation control section 8 outputs a modulation pattern P in accordance with that information. Optionally, the address A may further include additional information specifying the respective colors of R, G and B and the modulation control section 8 may output a modulation pattern P in accordance with that information. As a result, a chromatic aberration due to the difference in wavelength between the respective colors of R, G and B can be reduced effectively.

Also, in the preferred embodiment described above, the lens 2 is supposed to be a single bi-convex lens. However, the lens 2 may be modified according to any normal optical design technique. For example, the lens 2 may have any other lens shape such as a meniscus lens, may be a compound lens, may be combined with a diffraction element or may even be replaced with a reflective mirror with concave and convex surfaces. By appropriately adopting these modifications, various design options can be provided. For example, the chromatic aberration may be minimized by modifying the lens design but the aberration due to the angle of view may be eliminated by the deformable mirror. As a result, the optical system can be simplified adequately, some of the aberrations due to the angle $\alpha$, distance x and wavelength difference can be reduced and yet the number of modulation patterns P to be provided can be reduced as well.

Furthermore, in the preferred embodiment described above, the focus is controlled by getting the lens 2 moved by the lens moving mechanism 3. Alternatively, the lens moving mechanism 3 may be omitted and the lens 2 may be fixed on the housing 1. Such a configuration is obviously the best choice when the lens 2 has a large depth of field and this optical detection system is used as a performance camera. However, even if the depth of field of the lens 2 is small, the lens moving mechanism 3 for use in focus control can be omitted by creating a wavefront, equivalent to that obtained by getting the lens 2 moved along the optical axis by the lens moving mechanism 3, with the deformable mirror 4.

Furthermore, a member equivalent to the lens 2 may also be omitted. That is to say, the deformable mirror 4 may create a focusing plane and form a focal point on the photodetector 5. In such a configuration, the system can be further downsized and the number of parts members can be further reduced. In addition, the generation of chromatic aberrations can be minimized without performing any special control.

Also, in the preferred embodiment described above, each photosensitive area of the photodetector 5 includes 256×256 pixels. However, this number was selected arbitrarily. Alternatively, one pixel may define one photosensitive area, for example. The number of photosensitive areas may also be defined arbitrarily. And the greater the number of photosensitive areas, the more finely the aberration due to the angle of view can be corrected. Furthermore, one photometric point is defined per photosensitive area. However, it is naturally possible to provide a plurality of photometric points for each photosensitive area.

EMBODIMENT 2

Figure 7:
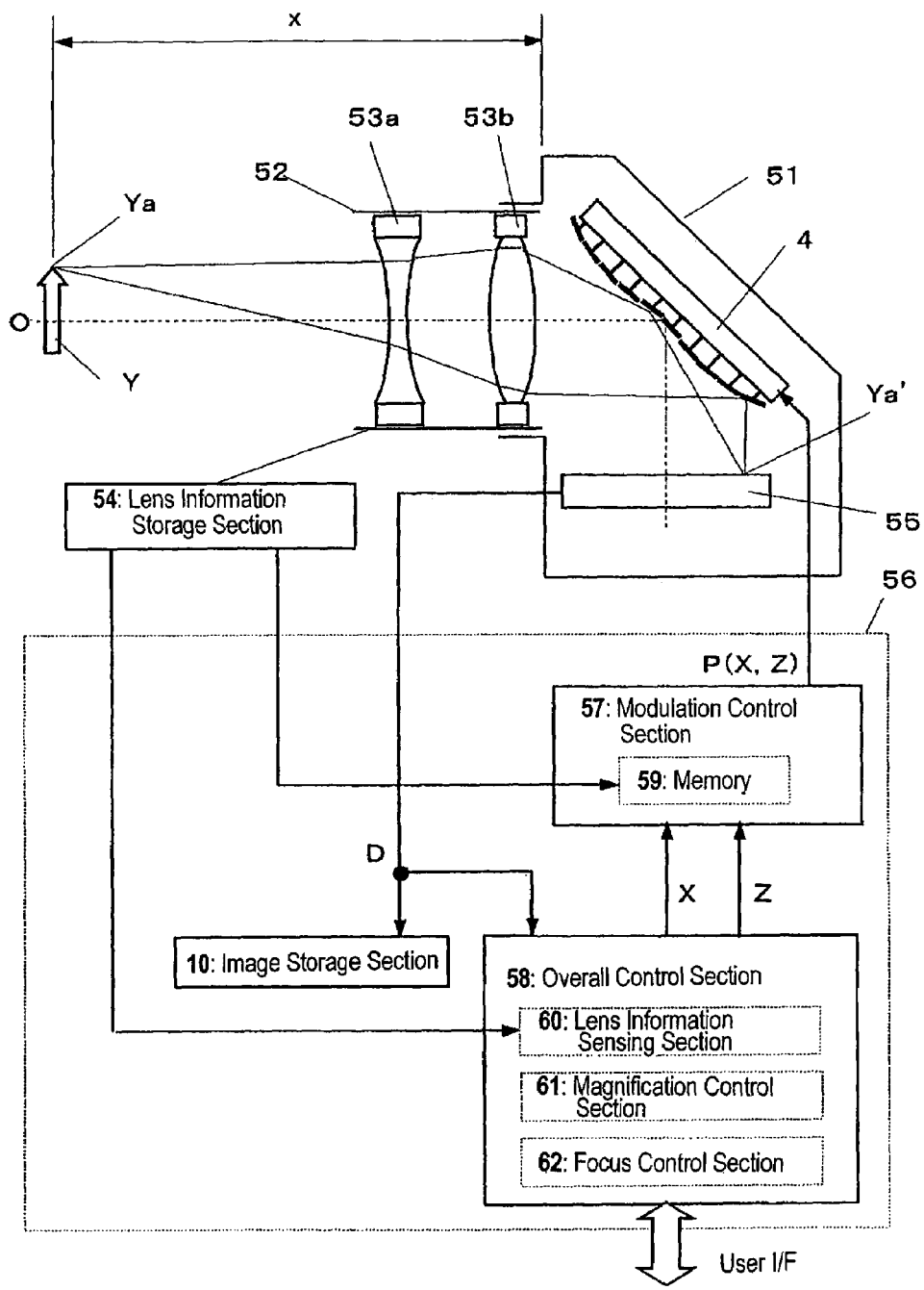
FIG. 7 is a diagram schematically showing a configuration for an optical detection system according to a second preferred embodiment of the present invention.

Hereinafter, an optical detection system according to a second preferred embodiment of the present invention will be described with reference to FIG. 7, which illustrates a schematic configuration for an optical detection system according to the second preferred embodiment of the present invention.

In this preferred embodiment, the deformable mirror 4, a photodetector 55, and a controller 56 are fixed to the housing 51 of the optical detection system. The controller 56 includes a modulation control section 57, the image storage section 10 and an overall control section 58. Also, a replaceable lens unit 52 is mounted on the housing 51. The deformable mirror 4 and image storage section 10 have the same configurations as those already described for the first preferred embodiment.

The lens unit 52 is provided so as to be attachable to, and removable from, the housing 51 and to be replaceable with another lens unit. In this preferred embodiment, the lens unit 52 includes a concave lens portion 53a and a convex lens portion 53b, which can shift independently of each other, so as to focus an incoming light ray, which has come from the object Y of imaging, on the photodetector 55 at multiple stages of imaging magnifications $\beta$. Supposing the concave lens portion 53a has a focal length of −70 mm, the convex lens portion 53b has a focal length of 50 mm, and the magnification is from $-\frac{1}{2}\alpha$ to −1, the lens unit 52 will be a zoom lens consisting of two groups with f=35 mm to 70 mm. In FIG. 7, the concave and convex lens portions 53a and 53b are illustrated as single lenses for the sake of simplicity but may also be compound lenses as well. In this preferred embodiment, the aberration due to the angle of view and the chromatic aberration are supposed to be minimized to negligible levels in actual use by designing these lens systems appropriately. Thus, it will be described how the deformable mirror 4 corrects the aberration caused by a variation in the state of the lens system when the imaging magnification $\beta$ of the lens unit 52 is changed by shifting the concave and convex lens portions 53a and 53b and a high-order aberration caused during a focusing operation according to the distance x to the object Y.

The lens unit 52 is provided with a lens information storage section 54, which may be a nonvolatile memory, for example, and which stores information about the type of the lens unit 52, the allowable range of the imaging magnification $\beta$, and the imaging performance when the lens unit 52 forms a focal point on the object Y at the distance x and with the imaging magnification $\beta$. In this case, the imaging performance particularly relates to the aberration property of the lens unit 52. In this preferred embodiment, preferable modulation patterns for the deformable mirror 4, which were obtained by either calculations or experiments as those contributing to correcting the aberrations in a most preferable manner when the lens unit 52 formed focal point on the object Y at the distance x and with the imaging magnification $\beta$, are stored in the lens information storage section 54. Those modulation patterns are stored as a table of correspondence with respect to the distance data X and imaging magnification data Z to be described later.

Also, the concave and convex lens portions 53a and 53b are provided with respective shifting mechanisms for shifting them independently of each other. The concave and convex lens portions 53a and 53b are controlled by the overall control section 58 so as to be driven independently of each other. The lens unit 52 further includes an encoder (not shown) for sensing the respective positions of the concave and convex lens portions 53a and 53b and outputting their positional information to the overall control section 58.

The photodetector 55 is implemented as a CCD image sensor or a CMOS image sensor in which pixels are arranged as a two-dimensional array. The photodetector 55 may be the same as the photodetector 5 as described for the first preferred embodiment. In this preferred embodiment, however, the photodetector 55 is a normal frame scanning type image sensor, of which the photosensitive region is not divided into multiple areas to be driven independently.

In accordance with the distance data X and imaging magnification data Z supplied from the overall control section 58, the modulation control section 57 generates a modulation pattern P(X, Z) to be output to the deformable mirror 4. In the memory 59 of the modulation control section 57, the modulation pattern table information, which has been read out from the imaging information storage section 54, is stored. And in accordance with the distance data X and imaging magnification data Z supplied from the overall control section 58, the modulation pattern P(X, Z) is read out from the memory 59.

The overall control section 58 includes a lens information sensing section 60, a magnification control section 61 and a focus control section 62 and controls the overall operation of the optical detection system.

The lens information sensing section 60 reads out the information from the lens information storage section 54, thereby sensing the type of the given lens unit 52. In accordance with this information, the overall control section 58 updates the modulation pattern table information to be stored in the memory 59.

In accordance with the user's operation command to increase or decrease the imaging magnification β, the magnification control section 61 controls the positions of the concave and convex lens portions 53a and 53b and generates the imaging magnification data Z based on the resultant positions of the concave and convex lens portions 53a and 53b.

The focus control section 62 moves the concave and convex lens portions 53a and 53b to in-focus positions according to the distance x between this optical detection system and the object Y. As in the first preferred embodiment described above, it is determined by locating a position, where the pixel-to-pixel contrast in the output of the photodetector 55 has a local maximum value, whether the incoming light rays are in focus or not. In this case, the concave and convex lens portions 53a and 53b are shifted back and forth at small steps while satisfying a predetermined positional relationship. In this manner, the position where the pixel-to-pixel contrast of the photodetector 55 has a local maximum value is searched for.

Every time the concave and convex lens portions 53a and 53b are shifted, the distance data X is output and the modulation control section 57 generates a modulation pattern P(X, Z) based on this distance data X. Thus, the high-order aberration can be removed by driving the deformable mirror 4 and the contrast local maximum value can be searched for with appropriate imaging performance achieved. As a result, it can be determined rather accurately whether the incoming light rays are in focus or not. Also, based on the result of this decision, the focus control section 62 generates the distance data X.

The overall control section 58 outputs the imaging magnification data Z and distance data X, which have been generated in this manner, to the modulation control section 57.

Hereinafter, it will be described how the optical detection system with such a configuration operates.

First, with the lens unit 52 attached to the housing 51, the lens information sensing section 60 recognizes the type of the given lens unit 52. The overall control section 58 reads out the information from the lens information storage section 54, thereby updating the contents of the memory 59. Next, in accordance with the user's zooming operation, the magnification control section 61 controls the positions of the concave and convex lens portions 53a and 53b, thereby determining the imaging magnification β and generating the imaging magnification data Z.

When the user presses down the shutter button (not shown) halfway, the overall control section 58 performs a focus control first. Specifically, the focus control section 62 shifts the concave and convex lens portions 53a and 53b, thereby searching for in-focus positions and determining the distance data X.

During the imaging operation, the modulation control section 57 generates the modulation pattern P(X, Z) based on these distance data X and imaging magnification data Z and the deformable mirror 4 is deformed according to this modulation pattern P(X, Z). And by deforming the deformable mirror 4, the aberration of the lens unit 52 can be corrected and an appropriate image is formed on the photodetector 55. The output data D of the photodetector 55 is stored in the image storage section 10.

As described above, the optical detection system of this preferred embodiment is designed such that the imaging magnification setting of the zooming lens unit 52 is sensed by the magnification control section 61 and that the modulation control section 57 achieves appropriate imaging performance according to the imaging magnification sensed. Accordingly, even if the optical system of the lens unit 52 is simplified, it is possible to effectively reduce the aberration to be generated when the imaging magnification of the lens unit 52 is changed.

Also, the optical detection system of this preferred embodiment is designed such that information about the imaging performance of the lens unit 52 is stored in the lens information storage section 54, which is provided as an integral part of the lens unit 52, and is sensed by the lens information sensing section 60 and that the modulation control section 57 achieves appropriate imaging performance in accordance with that information. Accordingly, even if the lens unit 52 is replaced with another lens unit 52 with a quite different imaging performance, the aberration can still be reduced effectively. Consequently, even in handling multiple lens units with various imaging performances (e.g., from a telescopic one to a wide angle one), their aberrations can be corrected effectively with their optical systems simplified. Or even when multiple lens units of the same types are handled, the variation in characteristic among the individual lens units can be corrected as well. That variation in characteristic among the individual lens units can be corrected effectively by storing the test data of the respective lens units in the lens information storage section 54.

The preferred embodiment described above is a configuration for correcting the aberrations associated with the imaging magnification β and distance x. Optionally, the configuration of this preferred embodiment may be combined with the configuration for correcting the aberration due to the angle of view and the chromatic aberration as described for the first preferred embodiment.

Also, in the preferred embodiment described above, the imaging performance information about the lens unit 52 to be stored in the lens information storage section 54 is the table information representing the modulation pattern generated by the modulation control section 57. However, the present invention is in no way limited to that specific preferred embodiment. For example, that information may represent the aberration data of the lens unit 52 as respective coefficients of a Zernike polynomial.

EMBODIMENT 3

Figure 8:
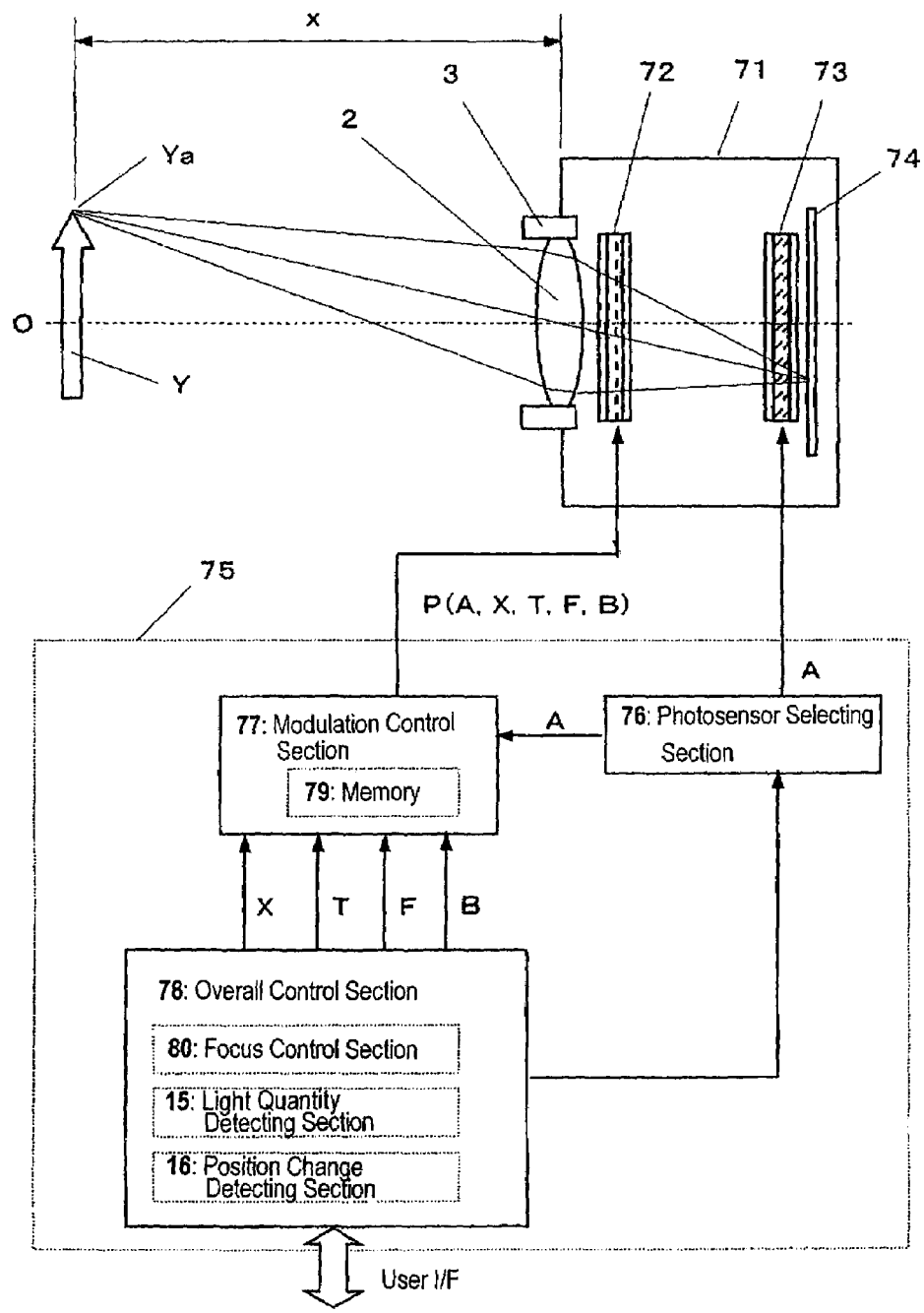
FIG. 8 is a diagram schematically showing a configuration for an optical detection system according to a third preferred embodiment of the present invention.

Hereinafter, an optical detection system according to a third preferred embodiment of the present invention will be described with reference to FIG. 8. In this preferred embodiment, portions of the spatial light modulator and photosensor selecting section are implemented as a liquid crystal element and the photodetector is implemented as a photosensitive film. FIG. 8 illustrates a schematic configuration for an optical detection system according to the third preferred embodiment of the present invention.

In this preferred embodiment, the lens 2, the lens moving mechanism 3, a liquid crystal phase modulator 72, a liquid crystal shutter 73, a photosensitive film 74 and a controller 75 are fixed to the housing 71 of the optical detection system. The controller 75 includes a photosensing selector 76, a modulation control section 77, and an overall control section 78. The lens 2 and lens moving mechanism 3 have the same configurations as those already described for the first preferred embodiment.

The liquid crystal phase modulator 72 is obtained by injecting a liquid crystal material with an analog phase modulating property such as a nematic liquid crystal material or a deformed helix ferroelectric (DHF) liquid crystal material between two glass substrates with matrix transparent electrodes. The liquid crystal phase modulator 72 modulates the phase of the incoming light ray by controlling the voltage between these transparent electrodes. On the light incoming side of the liquid crystal phase modulator 72, a first polarizer is provided such that a linearly polarized light ray is incident on the liquid crystal layer. Furthermore, both of the two glass substrates are subjected to an alignment treatment such that the liquid crystal molecules are oriented in this polarization direction. Thus, the incoming light ray being transmitted through the liquid crystal phase modulator 72 can have its optical path length controlled without changing its polarization direction. The liquid crystal phase modulator 72 may be made up of as many as 512×512 modulation elements, which are driven with multi-stage drive voltages so as to achieve a smooth phase conversion control. Also, the liquid crystal phase modulator 72 further includes a driver circuit (not shown) and modulates the phase in accordance with the modulation pattern P supplied from the modulation control section 77.

The liquid crystal shutter 73 is obtained by injecting a ferroelectric liquid crystal material between two glass substrates with matrix transparent electrodes, and controls the voltage between the transparent electrodes digitally (i.e., into either ON state or OFF state), thereby transmitting or cutting off the incoming light on an area-by-area basis. The liquid crystal layer of the liquid crystal shutter 73 is provided such that the liquid crystal molecules thereof are oriented parallel to the polarization direction of the incoming light ray. The liquid crystal shutter 73 is designed not to change the polarization direction of the incoming light ray when no voltage is applied between the transparent electrodes but to change the polarization direction of the incoming light ray due to the birefringence of the liquid crystal layer when a voltage is applied between the transparent electrodes. On the light outgoing side of the liquid crystal shutter 73, a second polarizer is provided. The second polarizer is arranged such that the polarization direction thereof is perpendicular to that of the first polarizer provided for the liquid crystal phase modulator 72.

Accordingly, when a voltage is applied between the transparent electrodes of the liquid crystal shutter 73, the incoming light ray has its polarization direction rotated approximately 90 degrees and is transmitted through the liquid crystal shutter 73. However, when no voltage is applied between the transparent electrodes of the liquid crystal shutter 73, the incoming light ray never has its polarization plane changed and is cut off by the shutter 73.

The number of opaque members that make up the liquid crystal shutter 73 may be about 5×5, for example. By removing the voltage from only selected ones of the opaque members, the incoming light ray can be transmitted through just arbitrary ones of those areas. The liquid crystal shutter 73 further includes a driver circuit (not shown) and transmits the incoming light ray through a location specified by the address A given from the photosensing selector 76, thereby exposing a portion of the photosensitive film 74, associated with that location, to the incoming light ray. In this arrangement, the photosensitive film 74 is divided into 25 photosensitive areas. That photosensitive area to be exposed to the incoming light ray in response to the address A will be referred to herein as an "activated photosensitive area".

The photosensitive film 74 is a normal photographing film and is a storage medium that changes its physical property due to a chemical reaction caused by exposure, thereby forming an image or a latent image thereon. The photosensitive film 74 is provided either in contact with, or at least very close to, the liquid crystal shutter 73.

During an imaging operation for one frame, the photosensing selector 76 sequentially switches the address A values, thereby exposing the 25 photosensitive areas to the light one after another. The addresses A generated by the photosensing selector 76 are also output to the modulation control section 77 at the same time, thereby synchronizing the photosensitive area selecting operation by the liquid crystal shutter 73 and the incoming light modulating operation by the liquid crystal phase modulator 72 with each other.

The modulation control section 77 generates the modulation pattern P(A, X, T, F, B) to drive the liquid crystal phase modulator 72. The contents of the modulation pattern P(A, X, T, F, B) and the addresses A, distance data X, shuttering time data T, stopping data F, and position change detection data B are almost the same as those described for the modulation control section 8 of the first preferred embodiment.

The overall control section 78 includes a focus control section 80, the light quantity detecting section 15 and the position change detecting section 16 so as to control the overall operation of the optical detection system. The light quantity detecting section 15 and position change detecting section 16 are the same as those already described for the modulation control section 8 of the first preferred embodiment. The focus control section 80 includes a range finder (not shown) to detect the distance x between this optical detection system and the object Y and controls the lens moving mechanism 3 to shift the lens 2 to an in-focus position according to this distance x. Also, the focus control section 14 outputs the distance data X representing this distance x.

Hereinafter, it will be described how the optical detection system with such a configuration operates.

When the shutter button (not shown) is pressed down halfway, the overall control section 78 performs a focus control first. Specifically, the distance x is measured by activating the range finder of the focus control section 80, the lens 2 is shifted to the in-focus position by the lens moving mechanism 3, and the distance data X is output to the modulation control section 77.

Next, the light quantity detecting section 15 outputs the illuminance data I(A) obtained from the respective photometric points. Based on this illuminance data I(A), the overall control section 78 determines the shuttering time data T(A) and stopping data F(A) and outputs them to the modulation control section 77.

The preparatory operation that has been carried out in response to the half-pressing of the shutter button is finished in this way. When the shutter button is pressed next time, the overall control section 78 will start an imaging operation. First, the position change detecting section 16 detects the biaxial angular velocities of the housing 1 and integrates together these angular velocity outputs from the imaging start point, thereby outputting position change detection data B.

The photosensing selector 76 sequentially switches the addresses A and outputs them to the liquid crystal shutter 73 and modulation control section 77. In this manner, only a selected portion, specified by the address A, is no longer shielded by the liquid crystal shutter 73 and a portion of the photosensitive film 74 in that activated photosensitive area is exposed to the incoming light. At the same time, the modulation control section 77 generates a modulation pattern P(A, X, T, F, B) to produce appropriate imaging performance in the respective photosensitive areas. In accordance with the modulation pattern P(A, X, T, F, B) supplied from the modulation control section 77, the liquid crystal phase modulator 72 modulates the incoming light. As a result of this modulation control, the aberration due to the angle of view can be corrected, the quantity of light falling on the photosensitive area can be controlled and the blurring can be corrected.

As described above, the optical detection system of this preferred embodiment includes the liquid crystal shutter 73 and photosensing selector 76, which are used to selectively transmit or cut off the incoming light ray through/from the photosensitive film 74. And the optical detection system is designed such that the modulation control section 77 generates a modulation pattern that realizes an appropriate imaging performance in the photosensitive area that has been selected by the liquid crystal shutter 73 and photosensing selector 76. Accordingly, even with a simple optical system, the aberration due to the angle of view can be reduced effectively over the entire area of the photosensitive film 74.

INDUSTRIAL APPLICABILITY

According to the present invention, a modulation control section to control a spatial light modulator generates a modulation pattern that contributes to achieving an appropriate imaging performance in response to a change in any of various factors including the angle of view and imaging magnification. Thus, reduction of the aberration or appropriate control of the light quantity over the entire area of the photodetector and simplification of the optical system can be achieved at the same time.

The invention claimed is:

1. An optical detection system comprising:
a spatial light modulator for modulating the phase of incoming light;
a photodetector having a plurality of photosensitive areas to receive the light of which the phase has been modulated by the spatial light modulator;
a photosensor selecting section for selecting at least one of the photosensitive areas and activating the selected photosensitive area effectively; and
a modulation control section for providing a modulation pattern, associated with the photosensitive area that has been selected by the photosensor selecting section, for the spatial light modulator,
wherein the photosensor selecting section cyclically switches the photosensitive areas to select by a time sequential technique, and
wherein synchronously with this switching operation, the modulation control section provides a modulation pattern, which produces appropriate imaging ability in the photosensitive area selected, for the spatial light modulator.

2. The optical detection system of claim 1, wherein the modulation control section picks one of a plurality of prepared modulation patterns according to the photosensitive area selected.

3. The optical detection system of claim 1, wherein the spatial light modulator is arranged on an optical path of an imaging optical system.

4. The optical detection system of claim 3, wherein the imagine optical system selectively exhibits one of multiple types of imaging characteristics, and
wherein the optical detection system further includes an imaging information sensing section for sensing information about the imaging characteristic that has been selected from the multiple types of imaging characteristics, and
wherein in accordance with the output of the imaging information sensing section, the modulation control section provides a modulation pattern, which produces an appropriate imaging ability, for the spatial light modulator.

5. The optical detection system of claim 4, wherein the imaging characteristic is an imaging magnification.

6. The optical detection system of claim 1, wherein the modulation control section provides a modulation pattern, which deviates the incoming light that has entered at least a portion of the spatial light modulator out of the photosensitive area selected, for the spatial light modulator.

7. The optical detection system of claim 6, wherein the modulation control section provides a modulation pattern, which changes the area of that portion of the spatial light modulator, for the spatial light modulator.

8. The optical detection system of claim 7, wherein the modulation control section selectively provides either a first modulation pattern, which makes the area of that portion of the spatial light modulator relatively large, or a second modulation pattern, which makes the area of that portion of the spatial light modulator relatively small, for the spatial light modulator, and controls the respective durations of the first and second modulation patterns.

9. The optical detection system of claim 6, wherein the light that has been deviated out of the photosensitive area selected is incident on another photosensitive area of the photodetector.

10. The optical detection system of claim 1, wherein the spatial light modulator is a deformable mirror.

11. The optical detection system of claim 10, wherein the deformable mirror includes: a plurality of light reflecting areas that are arranged on a substrate; and an actuator for displacing the light reflecting areas at least perpendicularly to the substrate.

12. The optical detection system of claim 11, wherein the deformable mirror is coupled to multiple actuators that are associated with the respective light reflecting areas, and wherein by driving the actuators independently of each other, the light reflecting areas are displaced perpendicularly to the substrate and/or tilted with respect to the substrate.

13. The optical detection system of claim 1, wherein each of the photosensitive areas of the photodetector includes a photoelectric modulating section, and wherein the optical detection system further includes:
a memory for storing the outputs of the photoelectric modulating section in the photosensitive area that has been selected by the photosensor selecting section; and
a reconstructing section for reconstructing an overall image by rearranging the outputs stored in the memory.

14. The optical detection system of claim 1, wherein the photodetector is a storage medium, of which a physical property changes when exposed to a radiation, and includes a shutter member that allows the photosensor selecting section to selectively transmit or cut off the incoming light.

15. An optical detection system comprising:
a spatial light modulator for modulating the phase of incoming light;
a photodetector having a plurality of photosensitive areas to receive the light of which the phase has been modulated by the spatial light modulator;
a photosensor selecting section for selecting at least one of the photosensitive areas and activating the selected photosensitive area effectively; and
a modulation control section for providing a modulation pattern, associated with the photosensitive area that has been selected by the photosensor selecting section, for the spatial light modulator,
wherein the incoming light entering the spatial light modulator includes light rays with multiple different wavelengths.

16. The optical detection system of claim 15, wherein the photosensor selecting section chooses, as light to be modulated, a light ray falling within a particular wavelength range from the light rays with the multiple wavelengths.

17. The optical detection system of claim 16, wherein the photosensor selecting section cyclically switches the light rays to choose by a time sequential technique, and
wherein synchronously with this switching operation, the modulation control section provides a modulation pattern, which produces appropriate imaging ability with respect to the light ray chosen, for the spatial light modulator.

18. An optical detection system comprising:
a spatial light modulator for modulating the phase of incoming light;
a photodetector having a plurality of photosensitive areas to receive the light of which the phase has been modulated by the spatial light modulator;
a photosensor selecting section for selecting at least one of the photosensitive areas and activating the selected photosensitive area effectively;
a modulation control section for providing a modulation pattern, associated with the photosensitive area that has been selected by the photosensor selecting section, for the spatial light modulator; and
a position change detecting section for detecting a change of the position of the optical detection system,
wherein in accordance with the output of the position change detecting section, the modulation control section generates a modulation pattern that compensates for a shift in focal point caused by the position change.

19. An optical detection system comprising:
a spatial light modulator for modulating the phase of incoming light
a photodetector having a plurality of photosensitive areas to receive the light of which the phase has been modulated by the spatial light modulator, the photosensitive areas having a plurality of pixels arranged at a pitch;
a photosensor selecting section for selecting at least one of the photosensitive areas and activating the selected photosensitive area effectively; and
a modulation control section for providing modulation pattern, associated with the photosensitive area that has been selected by the photosensor selecting section, for the spatial light modulator,
wherein the modulation control section provides a modulation pattern, which focuses the incoming light at multiple points that are shifted from each other by a distance corresponding to the pixel pitch of the photodetector, for the spatial light modulator.

20. An optical detection system comprising:
a spatial light modulator for modulating the phase of incoming light;
a photodetector having a plurality of photosensitive areas to receive the light of which the phase has been modulated by the spatial light modulator;
a photosensor selecting section for selecting at least one of the photosensitive areas and activating the selected photosensitive area effectively; and
a modulation control section for providing a modulation pattern, associated with the photosensitive area that has been selected by the photosensor selecting section, for the spatial light modulator,
wherein the spatial light modulator is a liquid crystal element.

21. An optical detection system comprising:
a spatial light modulator for modulating the phase of incoming light;
a photodetector having a plurality of photosensitive areas to receive the light of which the phase has been modulated by the spatial light modulator;
a photosensor selecting section for selecting at least one of the photosensitive areas and activating the selected photosensitive area effectively; and
a modulation control section for providing a modulation pattern, associated with the photosensitive area that has been selected by the photosensor selecting section, for the spatial light modulator,
wherein the spatial light modulator functions as an optical low pass filter.

* * * * *

UNITED STATES PATENT AND TRADEMARK OFFICE
CERTIFICATE OF CORRECTION

| | | |
|---|---|---|
| PATENT NO. | : 7,245,363 B2 | Page 1 of 1 |
| APPLICATION NO. | : 10/512408 | |
| DATED | : July 17, 2007 | |
| INVENTOR(S) | : Yoshihiro Mushika | |

It is certified that error appears in the above-identified patent and that said Letters Patent is hereby corrected as shown below:

<u>Title page, Item (56)</u>

The following reference should be added under <u>Foreign Patent Documents</u>:
-- WO   00/17810        3/2000 --;

<u>Column 24</u>

Line 21, "imagine" should read -- imaging --.

Signed and Sealed this

Twenty-seventh Day of November, 2007

JON W. DUDAS
*Director of the United States Patent and Trademark Office*